| United States Patent [19] | [11] | 4,153,648 |
|---|---|---|
| Li et al. | [45] | May 8, 1979 |

[54] THERMOPLASTIC NITRILE RESIN BLENDS

[75] Inventors: George S. Li, Aurora; John F. Jones, Cuyahoga Falls, both of Ohio

[73] Assignee: The Standard Oil Company, Cleveland, Ohio

[21] Appl. No.: 846,289

[22] Filed: Oct. 28, 1977

[51] Int. Cl.² ...................... C08L 23/00; C08L 33/00
[52] U.S. Cl. ................................ 260/896; 260/876 R; 260/897 C; 260/897 B; 260/898
[58] Field of Search ............... 260/898, 897 C, 897 B, 260/896

[56] References Cited

U.S. PATENT DOCUMENTS

| 2,688,008 | 8/1954 | Chaney et al. .................... 260/897 R |
| 3,674,536 | 7/1972 | Khelghatian et al. ............ 260/897 R |
| 3,926,871 | 12/1975 | Hensley et al. ..................... 526/267 |
| 3,926,926 | 12/1975 | Li et al. ................................. 526/224 |

Primary Examiner—J. Ziegler
Attorney, Agent, or Firm—John F. Jones; Larry W. Evans

[57] ABSTRACT

Blends of high-acrylonitrile thermoplastic copolymers with acrylonitrile-indene copolymers have improved softening temperatures, improved gas barrier properties and other improved physical properties.

8 Claims, No Drawings

THERMOPLASTIC NITRILE RESIN BLENDS

This invention relates to resin blends having high softening points, improved gas barrier properties and other improved physical properties, and more particularly is concerned with blends of high-acrylonitrile thermoplastic copolymers with indene-containing acrylonitrile copolymers. Thermoplastic copolymers of at least 50% by weight of acrylonitrile and up to 50% of at least one other comonomer which may also be rubber modified have previously been described in U.S. Pat. Nos. 3,426,102, 3,586,737, 3,763,278, and elsewhere. These copolymers have excellent barrier properties and can be molded into containers, pipes, films, sheets, and the like, to be used for packaging solids, liquids and gases of various types.

We have now discovered that the softening points of certain acrylonitrile copolymers can be raised significantly by blending these copolymers with small amounts of certain acrylonitrile-indene copolymers.

The acrylonitrile-indene copolymers useful in this invention are those more fully described and claimed in U.S. Pat. Nos. 3,926,871 and 3,926,926.

The high-acrylonitrile copolymers which are used in the predominant amount in the blends of this invention are those prepared by the polymerization of 100 parts by weight of (A) from 50 to 90% by weight of at least one nitrile having the structure $$CH_2=C-CN$$
$$|$$
$$R$$

wherein R is hydrogen, a lower alkyl group having from 1 to 4 carbon atoms, or a halogen, and (B) from 10 to 50% by weight based on the combined weight of (A) and (B) of at least one member selected from the group consisting of (1) styrene, (2) an ester having the structure $$CH_2=C-COOR_2$$
$$|$$
$$R_1$$

wherein $R_1$ is hydrogen, an alkyl group having from 1 to 4 carbon atoms, or a halogen, and $R_2$ is an alkyl group having from 1 to 6 carbon atoms, (3) an alpha-olefin having the structure $$\begin{array}{c} R' \\ | \\ CH_2=C \\ | \\ R'' \end{array}$$

wherein R' and R'' are alkyl groups having from 1 to 7 carbon atoms, (4) a vinyl ether selected from the group consisting of methyl vinyl ether, ethyl vinyl ether, the propyl vinyl ethers, and the butyl vinyl ethers, and (5) vinyl acetate, in the presence of from 0 to 40 parts by weight of (C) a rubbery polymer selected from the group consisting of (1) a rubbery polymer of a conjugated diene monomer selected from the group consisting of butadiene and isoprene and optionally at least one comonomer selected from the group consisting of styrene, a nitrile monomer having the structure $$CH_2=C-CN$$
$$|$$
$$R$$

wherein R has the foregoing designation, and an ester having the structure $$CH_2=C-COOR_2$$
$$|$$
$$R_1$$

wherein $R_1$ and $R_2$ have the foregoing designations, said rubbery polymer containing from 50 to 100% by weight of polymerized conjugated diene and from 0 to 50% by weight of comonomer, (2) ethylene-propylene rubber and (3) chlorobutyl rubber. Preferably, component (A) should be present in from about 60 to 90% by weight based on the combined weight of (A) and (B), and the rubber component (C) should contain more than 50% by weight of conjugated diene and more preferably from 60 to 90% by weight of the conjugated diene.

The acrylonitrile-indene copolymers which are useful as minor-component additives in the polymer blends of this invention are those resulting from the copolymerization of (A) from 50 to 90% by weight of at least one nitrile having the structure $$CH_2=C-CN$$
$$|$$
$$R$$

wherein R has the foregoing designation, (B) from 10 to 50% by weight of indene, and (C) from 0 to 40% by weight of an ester having the structure $$CH_2=C-COOR_2$$
$$|$$
$$R_1$$

wherein $R_1$ and $R_2$ have the foregoing designations.

It is preferred that from 5 to 15 parts of the acrylonitrile-indene copolymer per 100 parts of acrylonitrile copolymer be used in the polymer blends of this invention.

The invention is further illustrated in the following examples in which the amounts of ingredients are given in parts by weight unless otherwise indicated.

EXAMPLE 1

A. A nitrile rubber-modified copolymer of 75 parts of acrylonitrile and 25 parts of methyl acrylate was prepared by the procedure of Example X in U.S. Pat. No. 3,426,102. This resin was found to have an ASTM heat-distortion temperature of 69° C., a Rockwell hardness (M) of 64, a water vapor transmission rate of 6.8 gm-mil/100 inches$^2$/24 hours/atmosphere and an oxygen transmission rate of 1.0 cc-mil/100 inches$^2$/24 hours/atmosphere.

B. A graft copolymer of 75:25 acrylonitrile: styrene onto a 75:25 butadiene:styrene rubber was prepared according to the polymer A procedure in U.S. Pat. No. 3,984,499. The final resin was found to have ASTM heat-distortion temperature of 89° C., a water vapor transmission rate of 6.0 gm-mil/100 inches$^2$/24 hours/atmosphere and an oxygen transmission rate of 2.1 cc-mil/100 inches$^2$/24 hours/atmosphere.

C. A copolymer of acrylonitrile and indene was prepared using the procedure of Example 1 of U.S. Pat.

No. 3,926,926 from a mixture of 65 parts of acrylonitrile and 35 parts of indene. The resulting polymer was found to have an ASTM heat-distortion temperature of 128° C.

D. A copolymer of acrylonitrile, indene and methyl acrylate was prepared using 75 parts of acrylonitrile, 20 parts of indene and 5 parts of methyl acrylate using the procedure of Example 1 of U.S. Pat. No. 3,926,871. This resin was found to have an ASTM heat-distortion temperature of 100° C.

E. Example 1C was repeated using 60 parts of acrylonitrile and 40 parts of indene. The resulting resin had an ASTM heat-distortion temperature of 123° C.

EXAMPLE 2

One hundred parts of polymer A of Example 1 and 5.3 parts of polymer D of Example 1 were mixed in a Brabender plasticorder mixer at 230° C. for from 5 to 10 minutes. Compression molded test bars of this blend were made at 210°–230° C., 4000 psi, and the ASTM heat-distortion temperature tests performed on the test bars were found to be 74° C. and the Rockwell Hardness (M) was 71.

EXAMPLE 3

The procedure of Example 2 was repeated except that 11 parts of polymer D of Example 1 were used. The ASTM heat-distortion temperature of the resulting blend was found to be 73° C., the oxygen transmission rate was 0.67 cc-mil/100 inches$^2$/24 hours/atmosphere, the water vapor transmission rate was 4.3 gm-mil/100 inches$^2$/24 hours/atmosphere and the Rockwell Hardness (M) was 73.

EXAMPLE 4

The procedure of Example 3 was repeated using polymer C of Example 1 instead of polymer D of Example 1. The resulting blend was found to have an ASTM heat-distortion temperature of 74° C. and a Rockwell Hardness (M) of 74.

EXAMPLE 5

One hundred parts of polymer B of Example 1 and 12.5 parts of polymer E of Example 1 were blended as in Example 2. The resulting resin was found to have an ASTM heat-distortion temperature of 96° C., a Rockwell Hardness (M) of 91, an oxygen transmission rate of 1.4 cc-mil/100 inches$^2$/24 hours/atmosphere and a water vapor transmission rate of 6.0 gm-mil/100 inches$^2$/24 hours/atmosphere.

We claim:

1. The blend composed of 100 parts by weight of
   (I) a polymer prepared by the polymerization of 100 parts by weight of
      (A) from 50 to 90% by weight of at least one nitrile having the structure $$CH_2=C-CN$$
      $$|$$
      $$R$$

wherein R is hydrogen, a lower alkyl group having from 1 to 4 carbon atoms, or a halogen, and
      (B) from 10 to 50% by weight based on the combined weight of (A) and (B) of at least one member selected from the group consisting of
         (1) styrene,
         (2) an ester having the structure $$CH_2=C-COOR_2$$
         $$|$$
         $$R_1$$

wherein $R_1$ is hydrogen, an alkyl group having from 1 to 4 carbon atoms, or a halogen, and $R_2$ is an alkyl group having from 1 to 6 carbon atoms,
         (3) an alpha-olefin having the structure $$R'$$
         $$|$$
         $$CH_2=C$$
         $$|$$
         $$R''$$

wherein R' and R" are alkyl groups having from 1 to 7 carbon atoms,
         (4) a vinyl ether selected from the group consisting of methyl vinyl ether, ethyl vinyl ether, the propyl vinyl ethers, and the butyl vinyl ethers, and
         (5) vinyl acetate, and from 5 to 15 parts by weight of
   (II) a polymer resulting from the copolymerization of
      (A) from 50 to 90% by weight of at least one nitrile having the structure $$CH_2=C-CN$$
      $$|$$
      $$R$$

wherein R has the foregoing designation,
      (B) from 10 to 50% by weight of indene, and
      (C) from 0 to 40% by weight of an ester having the structure $$CH_2=C-COOR_2$$
      $$|$$
      $$R_1$$

wherein $R_1$ and $R_2$ have the foregoing designations.

2. The blend of claim 1 wherein (I) (A) is acrylonitrile.
3. The blend of claim 2 wherein (I) (B) (1) is styrene.
4. The blend of claim 2 wherein (I) (B) (2) is methyl acrylate.
5. The blend of claim 1 wherein (II) (A) is acrylonitrile.
6. The blend of claim 1 wherein (II) (C) is methyl acrylate.
7. The blend of claim 3 wherein (II) (A) is acrylonitrile and (II) (C) is methyl acrylate.
8. The blend of claim 4 wherein (II) (A) is acrylonitrile and (II) (C) is methyl acrylate.

* * * * *